United States Patent Office 3,231,420
Patented Jan. 25, 1966

---

3,231,420
PROCESS FOR TREATING LEATHER AND LEATHERS OBTAINED
John A. Lowell, Philadelphia, Edwin H. Kroeker, Ivyland, and Peter R. Buechler, Langhorne, Pa., assignors to Rohm & Haas Company, Philadelphia, Pa., a corporation of Delaware
No Drawing. Filed July 6, 1962, Ser. No. 208,092
11 Claims. (Cl. 117—142)

This invention is concerned with impregnated leathers and the improvement of leather by a treatment which involves an impregnation thereof with certain materials for the purpose of preparing it for finishing. It is particularly concerned with a treatment which provides leathers having improved break, fuller substance, and improved resistance to abrasion and scuffing.

It is already known to impregnate leathers with organic solvent solutions of certain polymeric substances and plasticizers therefor. The products obtained by such treatments tend to change with time as plasticizer migration into the leather is gradually lost. When aqueous systems are employed with vegetable-tanned leathers, especially case and upholstery leathers where large amounts of uncombined tannins are present, the penetration is hindered by the swelling and consequent pore-blocking caused by the aqueous systems.

In accordance with the present invention it has been found that leathers can be improved in break and resistance to scuffing by impregnation of the leather with an organic solvent solution of certain copolymers without the use of plasticizers.

In accordance with the present invention, the leather is impregnated from the grain side with a certain polymeric material in an organic solvent solution in such manner that the entire corium minor is penetrated and a substantial amount of polymer is deposited within the corium minor and at the junction of the corium minor and the corium major. The nature of the polymer is also important in that it contains acid units which cause the polymeric substances to increase the tenacity of adherence of the corium minor layer to the corium major thereunderneath. In other words, the treatment of the present invention involves substantially complete penetration of the corium minor and involves considerable permeation or penetration of the polymer through all of the areas of the corium minor and not merely the filling of the hair follicles and openings to sebaceous glands.

The copolymers are water-insoluble copolymers, of a mixture of monoethylenically unsaturated molecules comprising (a) about 3.5 to 18.5 mol percent, and preferably 6 to 12.5 mol percent, of an acid of the group consisting of acrylic acid, methacrylic acid, and itaconic acid, (b) 1.5 to 8 mol percent, preferably 1.5 to 5 mol percent, of at least one ester of an acid of the formula

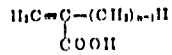

in which $n$ is an integer having a value of 1 to 2, with a saturated monohydric aliphatic alcohol having 8 to 18 carbon atoms, (c) from 10.5 to 43 mol percent, preferably 16 to 27 mol percent of methyl, ethyl, or isobutyl methacrylate, and (d) about 47 to 84.5 mol percent, preferably 58.5 to 80 mol percent, of an ester of acrylic acid with a saturated monohydric alcohol having 1 to 4 carbon atoms, with the additional provisos that the total of (a) and (c) should be from 15 to 45 mol percent and that the mol ratio of (b) to (c) should be from 1:3.3 to 1:6.7.

A portion of the methyl, ethyl or isobutyl methacrylate may be replaced with acrylonitrile, methacrylonitrile, vinyl acetate, vinyl chloride, vinylidene chloride, styrene, or vinyltoluene or mixtures thereof provided the copolymer contains at least 10.5 mol percent of methyl, ethyl, or isobutyl methacrylate after such replacement; hence the copolymer may contain up to 32.5 mol percent of one or more of the replacement monomers mentioned. In addition, small amounts of neutral hydrophilic comonomers may be included such as hydroxyethyl acrylate, acrylamide, methacrylamide, or N-methylolacrylamide. The amount of such hydrophilic comonomers may be as high as 5 mol percent or more of the total weight of copolymer, the upper limit being dictated by the requirement that the copolymer be insoluble in water. It is essential, however, that the total amount of the monomer (c) and the hydrophilic comonomer should not exceed 45 mol percent.

The copolymers used in accordance with the present invention for impregnating leather are formed of at least four different monomers as is clear from the definition above. Each is essential as equivalent effects cannot be obtained if one of the four types is omitted. The acid component (a) provides sites in the copolymer having a peculiar affinity for the protein component of the leather fibers, favoring retention of the copolymer in the leather even when it is soaking wet, as from rain. It also reduces the susceptibility of the copolymer to migration when a subsequently-applied coating composition in an organic solvent is applied during finishing. The inclusion of component (b), the higher acrylate or methacrylate esters, imparts flexibility and also solubility in non-polar hydrocarbon solvents, and has a distinct advantage as pointed out hereinafter in that it reduces swelling of the leather, and favors penetration. The hardening component (c), represented primarily by methyl methacrylate, is essential to avoid excessive softness, stickiness, and gumminess of the surface of the impregnated leather. It is also essential to provide the desired "break" improvement. Without this component, little or no improvement in break is obtained. It is also essential that the sum of the acid and hardening components (a) and (c) in the copolymer amount to at least 15 mol percent in order to obtain the desired break improvement. On the other hand, the sum of these two components must not exceed 45 mol percent in the copolymer; otherwise, the impregnated leather shows severe grain cracking, and boardiness and feels like a plastic sheet instead of leather. The ratio of components (b) and (c) specified above must also be observed if an improvement in break and resistance to scuffing are to be obtained while retaining the desirable leather properties including the temper, well-rounded feel, flexibility, fullness, and susceptibility to be manipulated efficiently in manufacturing operations, including adaptability to be die-cut smoothly and evenly without difficulty. It is to be noted that polymers of components (b) alone, (d) alone, or of a mixture of (b) and (d) or of any of these types even with (a) provide little or no improvement in break and generally provide other undesirable qualities as well, such as excessive softness or looseness, waxy, rubbery, or gummy instead of leathery feel.

To provide good qualities in the impregnated leather, the average molecular weight of the copolymer should be at least 10,000 but should not be so high nor should the molecular weight distribution be such that the viscosity of a 20% solution at 25° C. in a solvent system by which it is to be applied exceeds 20 centipoises when measured on a Brookfield Synchro-Lectric viscometer model LVT using a No. 1 spindle at 60 r.p.m.

The improvement of fullness and feel afforded by the present invention is especially noticeable on the skins of smaller animals, such as sheep, goats and pigs, making them suitable for such products as certain types of shoe leathers for which only the skins of larger animals as cowhides, steerhides, and horsehides have heretofore generally been considered suitable. The process of the present invention also has the advantage that it in many cases reduces the need for retannage or completely eliminates such need.

The solvents that may be used include alcohols, ketones, esters, hydrocarbons and chlorinated hydrocarbons. Examples include ethyl alcohol, methyl alcohol, isopropyl alcohol, or tert-butyl alcohol. Examples of ketones include acetone, methyl ethyl ketone, methyl isopropyl ketone, diisobutyl ketone, methyl isobutyl ketone and ethyl isopropyl ketone. Examples of ethers include dioxane, diethyl ether, tetrahydrofuran and diisopropyl ether. Examples of esters include ethyl acetate, isopropyl acetate, butyl acetate, 2-ethoxyethyl acetate, 2-butoxyethyl acetate, ethyl propionate, and methyl butyrate. Examples of ether alcohols include diethylene glycol, the monoethyl ether of diethylene glycol, and also the monomethyl, monopropyl, and monobutyl ethers of diethylene glycol. Examples of hydrocarbons include benzene, toluene, xylenes; petroleum and solvent naphthas of aromatic character and mixtures of these aromatics with aliphatics such as octane and decane. Chlorinated hydrocarbons include methylene chloride, ethylene dichloride, perchloroethylene, chloroform, bromoform, and carbon tetrachloride.

The particular solvent may be composed of a single solvent material or it may be composed of a mixture of any of the materials mentioned hereinabove. Preferred solvents are the hydrophobic types of hydrocarbon or halogenated hydrocarbon type. These solvents have the advantage of not swelling the leather or its components and thereby avoiding the tendency of the solvent-soaked components to swell and block the pores and hinder the penetration of the solution of the polymer. All of the organic solvent systems, whether of hydrophobic character or of the other types mentioned hereinabove, are characterized by substantially less tendency to swell the components of the leather than is generally associated with aqueous media.

The copolymers may be prepared in any suitable fashion provided they are of proper molecular weight as defined hereinabove. Such copolymers are readily produced by copolymerization in suitable solvents including any of those mentioned hereinabove. The solvent that is to be employed for the impregnation of the leather may be used in the preparation of the copolymer itself so that there is no need to recover the polymer from the initial solution formed and to redissolve such polymer.

The choice of proportions of the comonomers to be used depends in part upon the flexibility or firmness desired in the product. By using a large total proportion of components (b) and (d) highly flexible products are obtained without the use of plasticizers, whereas a low total of (b) and (d) within the ranges indicated imparts greater firmness without causing undesirable stiffening or grain cracking. The use of the several components of the copolymer in the preferred range specified herein provides the optimum combination of properties obtainable by the present invention.

The concentration of the copolymer solution may vary widely. For example, concentrations of 10 to 30% may be employed for most of the copolymers. The use of higher concentrations up to 35% may be permissible with the copolymers of extremely low molecular weight, whereas it may be necessary to use concentrations even lower than the lower limit of the range mentioned when the copolymer is of molecular weight near the upper limit of the range given above.

The copolymer solution may also contain additional materials such as dyes, pigments, and other polymeric materials in small proportions. The amount of such additional polymeric substances should be kept relatively low as compared to the copolymer, and it is preferably not over 25% of the weight of the copolymer. The use of a dye or a pigment is sometimes desirable to reduce the number of subsequent finish coatings when a colored leather is to be produced. The proportion of pigment, however, should not be enough to hinder the entry and penetration of the copolymer solution into the leather and thus prevent the complete penetration of the copolymer through the thickness of the corium minor. In general, the amount of pigment should not exceed 15 parts per 100 parts by weight of the solution used for impregnation.

Non-plasticizing oils may also be included in the impregnating solution. The solvent solution application offers advantages over aqueous impregnation in that the leather fibers are not swollen during application of the impregnating polymer and thus do not form adhesions during the drying process. However, if the leather is to be subsequently wet with water, e.g. by the application of aqueous finishing coats, it is sometimes useful to apply oils which lubricate the leather. These replace the leather fat liquor which was originally present in the grain surface of the leather and which reduces such "aqueous" adhesions but which can be driven from the grain surface by the application of the solvents in the impregnating mixture.

Natural oils such as neat's-foot, coconut, sperm and cod oils can be employed as leather lubricants. Such oils tend to migrate on later flexing of the leather but can be prevented from doing so by the addition of a long chain solvent-soluble molecule containing a polar group. Examples of the latter are oleic acid, alkenyl succinic acid anhydrides such as octadecenyl, primary tallow amine, ($C_8$–$C_{18}$)-alkylamines, such as tertiary-dodecyl amine, tertiary-pentadecyl amine, and mixtures thereof, and the monoglyceridyl glycolates of natural oils such as neat's-foot monoglyceridyl glycolate. In general $\frac{1}{10}$ as much polar constituent as of non-polar natural oil is required to prevent migration of the oil mixture during flexing of the leather. The total concentration of oils in the impregnation mixture is usually 3–7%.

The copolymer solution may be applied in any fashion provided it is applied under such conditions that time is available for adequate penetration before extensive drying of the solution occurs. In the preferred method, the solution is swabbed, brushed, or sprayed on the grain surface only of the leather. The swabbing, brushing, or wiping action employed may be extended in duration as the means to assure adequate penetration and deposition, and for this purpose, the normal equipment that is used simply for coating leather is ordinarily inadequate, since such equipment involves a mere brushing to spread the coating evenly over the surface followed substantially immediately by drying. For the purpose of accomplishing the impregnation by a brushing operation, it is necessary that the brushing be continued for a comparatively extended period of time while the impregnating material is applied to the surface of the leather and maintained thereon in wet condition. Thus, an extended period of concurrent application and brushing should be carried out to prevent the drying of the material on the surface before extensive penetration can be accomplished. Hence, ordinary spraying or seasoning equipment for leather coating cannot be employed without modification. Specially designed equipment capable of applying heavy amounts of organic solvent solutions of polymer may be utilized.

The copolymer solution may be applied by drumming or by application to the flesh side, but these expedients do not provide the most favorable results. In both these cases, deposition of the copolymer in the flesh side of the leather is more or less favored. This may be suitable for some types of leather, such as cordovan, but it cannot provide the outstanding improvement in break desired by the present invention which requires a high concentration of the copolymer in the corium minor and relatively little or no deposition through the corium major.

More or less of the copolymer may be left as a coating upon the leather at the end of the impregnation process depending upon the particular manner of effecting the impregnation. However, whether or not a substantial amount of polymer material is left at the surface, it is essential that the copolymer be forced to penetrate through the corium minor or grain layer and to deposit the copolymer within the entire thickness thereof, and at the junction with the corium major. Mere filling of hair pockets with the copolymer will not suffice. Although it is not essential to follow the impregnation treatment of the present invention with a finishing treatment involving the application of one or more coats of a finishing composition, it is generally preferred to provide such a finishing treatment.

The impregnation may be effected at room temperature or at somewhat elevated temperatures up to 80° C., the higher temperatures being particularly useful when it is desirable to obtain an even lower viscosity with a given concentration of certain of the copolymers.

After deposition of the copolymer within the body of the leather, the leather is subjected to a drying step. This may be carried out at room temperature or it may be accelerated by heating to somewhat elevated temperatures such as at about 50 to 70° C. On drying, the organic solvent present is volatilized, leaving the dry water-insoluble acid copolymer within the body of the leather.

The invention is, of course, applicable to full-grain leathers, but more particularly it is suited to snuffed or buffed grain leathers and improves the break characteristic of leathers of these types, as well as improving the resistance to scuffing and abrasion. It also renders the subsequently finished leathers more readily repaired if any scuffing penetrates through the finish coats.

The ability of the solution to penetrate the leather depends upon the viscosity and surface tension of the ingredients and their proportions. Viscosity can be lowered by proper selection of the solvent and by increasing the amount of solvent. However, the desirable viscosity in a particular application depends also upon the porosity of the leather in a particular application. This, in turn, is affected by many factors, such as the type of skin, i.e., calf, cowhide, goat, etc., the method of tanning, the extent of the tannage, the conditions of tanning, such as pH, the oil and grease content, previous processes such as liming and bating, the mechanical handling of the skin and the tanning and drying processes, such as setting out and staking, and the amount of buffing.

The depth of penetration is controlled primarily by the amount of solution applied, once the penetrability of the solution has been regulated so as to allow it to penetrate in the first place. The depth of penetration is increased with increasing amounts of solution. Cowhide upper leather will absorb roughly its own weight of liquid. Since a penetration of at least 15% of the thickness of the leather is generally required for best results depending on the proportion of corium minor to corium major, a 15% penetration of cowhide corresponds approximately to application of liquid solution in weight of 15% of the weight of the leather, and correspondingly for other proportions. Furthermore, a small amount of penetration of less than three to five percent of the thickness of the leather can be worse than no treatment and can result in a very coarse break which is undesirable.

As between individual skins of a particular type to be treated, particularly sheepskin, the total thickness of the skin will vary and therefore the proportion of thickness of the grain layer to total thickness of the skin may vary considerably. Therefore, an average quantity of solution per unit of area must be determined and used for a particular run. For instance, in a particular run the variation of grain layer thickness to total skin thickness may vary from 20% to 40% and the optimum penetration for the run will then be determined at 30%.

As previously stated, a small degree of penetration with respect to thickness is more likely to be harmful than beneficial. It is recognized that attempts have been made to improve the characteristics of leathers by impregnation of the entire thickness of the leather. However, such total thickness impregnation must also be avoided in the present process because in addition to the substantially greater cost of materials involved, in total thickness impregnation the natural characteristics of the leather are impaired. For instance, it is desirable that shoe upper leather be capable of absorbing perspiration vapor and dispersing it to the outside. For this purpose high quality shoe upper leather has absorptive qualities and vapor permeability and these characteristics are inhibited little if any by our process of partial impregnation, whereas total thickness impregnation markedly reduces the moisture absorptive property and vapor permeability of the leather.

The non-impregnated thickness of the leather product of the present invention is substantially free from the copolymer so that its vapor permeability and flexibility is not substantially affected by the treatment. It is believed that this is one of the reasons why the overall vapor permeability and flexibility of the treated product throughout its entire thickness is not reduced to such an extent as to make the product unsuitable for use as shoe uppers as is the case when the entire leather thickness is impregnated with the resin solution of the present invention. However, it will be appreciated that comparatively small quantities of copolymer may be present in the remaining thickness, or on the flesh surface, of the leather without reducing the natural flexibility and vapor permeability thereof sufficiently to make the overall flexibility and vapor pearmeability unsatisfactory. For example, the leather may have small holes or cuts passing from the grain surface into the flesh layer through which the solution flows when it is applied to the grain surface. Consequently, when it is stated herein that the remaining thickness of the leather is "substantially free from said copolymer" it is meant that such remaining thickness does not contain a sufficient amount of copolymer to materially modify the natural properties thereof and it is not intended by such term to exclude small quantities of copolymer in such remaining thickness which are insufficient to reduce the vapor permeability and flexibility properties thereof to a degree which will render the overall flexibility and permeability of the leather product unsuitable for the purposes set forth. Furthermore, the statement used herein that the copolymer solution is applied "to the grain surface only" does not exclude any kind of treatment which results in such small quantities of coplyomer being present in the remaining thickness of the finished product.

The impregnation of the present invention is adapted to be applied to any type of leather such as that obtained from the skins of calves, cattle, goats, sheep, horses, and regardless of the particular manner of tanning. Thus, the leather may be that obtained by chrome tanning, zirconium tanning, vegetable tanning, or tanning by the use of synthetic tanning agents. It is particularly valuable with chromium-tanned leather. At the time of the application of the impregnation, the leather should generally be that obtained after the drying of the tanned, dyed, and/or fat-liquored leather.

The impregnation treatment of the present invention improves the break, the filling, and the resistance to abrasion and scuffing of the leather. The improvement is such that even with tanned leathers of poor quality, impregnated leathers of high quality can be obtained that are suitable for use as shoe uppers, shoe linings, handbags, belts, garments, gloves, luggage, footballs, baseballs, bookbindings, upholstery and other related uses. The improvement in the break referred to is so outstanding that inferior grades of leathers which command a low price because they ordinarly cannot be finished into high quality leather having good break characteristics can be treated by the present invention and converted into high quality leathers having good characteristics as far as break is concerned. In other words, the present invention serves to upgrade leathers, whether the inferiority of the leather treated is that inherent in the particular hide from which the leather was produced or that resulting from the tanning and/or other operations by which it was produced. Because of this capacity of the present invention, it may be applied to the leathers obtained from loose flanks and bellies which are ordinarily of such inferior grade that they have been discarded or used only as so-called "offal" leathers. When applied to such poor grade materials, the finished leathers that can be obtained are so improved in quality that they can be used for the making of shoes, upholstery, bags, belts, briefcases, etc., where high-grade leathers are needed. In addition, sufficient filling action is provided by the copolymer to firm the loose areas such as bellies and flanks of the leather so that more of these articles of commerce can be obtained from the leather than would otherwise be possible.

After application of the impregnation, whether or not it involves the leaving of any of the copolymer on the surface, the leather may be, and preferably is, finished by the application of one or more coatings. This subsequent coating may be any polymeric or other material normally employed for leather finish coatings. It may, of course, be pigmented, dyed, or not, as desired. Conventionally used finishing materials such as nitrocellulose lacquers of aqueous dispersions or organic solvent solutions of vinyl or acrylic polymers have been found suitable for finishing such impregnated leathers.

In finishing, the surprising discovery was made that the adherence of these leather finishes to such impregnated leather was better than to the surface of the same leather prior to impregnation. In addition, the wet-molding qualities of the finished impregnated leathers are greatly enhanced. This is particularly the case when the leather is plated after application of one or more finish coats.

The process of the present invention is characterized particularly with the application of hydrophilic acid copolymers to leather in an organic solvent system that is adapted to provide a flexible leather which is not characterized by undesired stiffness.

The process of the present invention is adapted to produce leathers having improved break and scuff resistance without the necessity of employing an alkaline aqueous medium for the impregnation of the leather which tends to swell some types excessively, thereby tending to provide non-uniform impregnations and to slow down the rapidity of impregnation.

In the following examples which are illustrative of the invention, the parts and percentages are by weight unless otherwise indicated.

Example 1

(a) *Preparation of copolymer.*—A stainless steel kettle was fitted with an agitator, a thermocouple, inlet pipe for nitrogen gas, pot for holding the monomer, funnel for catalyst solution, water-cooled condenser, and steam-heated jacket.

The polymerization vessel was flushed with nitrogen and charged with 34 lbs. of toluene and 3.83 lbs. of cumene which mixture was heated to 105–110° C. A monomeric mixture was made up consisting of:

Ethyl acrylate, inhibited with 200 p.p.m. of monomethyl ether of hydroquinone (0.205 lb. moles) _____ 20.47 lbs.
Methyl methacrylate, inhibited with 60 p.p.m. of monomethyl ether of hydroquinone (0.063 lb. moles) _____ 6.3 lbs.
($C_{14}$–$C_{18}$)-alkyl methacrylate derived from a mixed technical alcohol mixture which was 2% tetradecanol, 30% hexadecanol, and 68% octadecanol, uninhibited, 98% pure by saponification number (0.010 lb. moles) ___ 3.22 lbs.
Methacrylic acid, inhibited with 250 p.p.m. of monomethyl ether of hydrquinone (0.018 lb. moles) _____ 1.57 lbs.

A catalyst solution was also made up in another vessel consisting of:

| | Pounds |
|---|---|
| Toluene | 6.93 |
| Benzoyl peroxide | 0.788 |

Concomitant addition of 20% of the monomeric mixture and 20% of the catalyst solution was then made to the polymerization kettle and a batch temperature of 108–103° C. was maintained for 20 minutes before the rest of the monomeric solution and catalyst solution were added gradually and concomitantly during 100 minutes. The batch temperature was maintained at 110°–111° C. 4½ hours; thereafter at 100°–101° C. for 2½ hours. At 7 hours, 5.07 lbs. of toluene was added and the batch allowed to cool to 30° C. The product was a toluene: cumene solution, 40.2% of copolymer. The yield of solids in the solution was 74 lbs., 2 oz. At 25° C., the viscosity of the 40.2% solution, as measured on a "Synchro-Lectric" Brookfield viscometer, was 63 centipoises. The flash point (Tag) was 54° F. The viscosity at 25° C. in the same solvent but at 20% concentration was 7.4 cps.

(b) Higher flash points are obtained when the copolymer is made in other solvents. For example, the following runs gave the following results:

| Run | Solvent | Percent Solids | Visc. 20% cps. | Flash Point Found |
|---|---|---|---|---|
| A | Solvesso #150 (a high flash high aromatic solvent naphtha boiling in the range of 360 to 400° F. | 40 | 7.9 | 152° F. Tag. |
| B | Solvesso #150/toluene=95.6/4.4 (weight ratio). | 40 | 7.5 | 100° F. Tag. |
| C | Solvesso #100 (a high flash high aromatic solvent naphtha boiling in the range of 321 to 340° F. | 40 | 6.7 | 118° F. Open Cup. |

(c) An impregnation mixture was applied to bad-breaking full-grain chrome tanned, lightly vegetable re-tanned calfskin by swabbing on two wet coats with a felt swab. The first coat was applied with a dripping wet swab which was rewet often to keep it saturated. Then before the polymer could "set" or dry due to the absorption of the solvent by the leather, a second wet coat was applied in a similar fashion. Uptake of the solvent solution by the leather was 38% of its original dry weight. The composition of the impregnation mixture was as follows:

| Ingredients: | Parts by weight |
|---|---|
| Polymer solution (of part a) | 73.2 |
| Toluene | 26.8 |
| Neat's-foot oil (20° cold test) | 10.0 |
| Oleic acid | 1.0 |
| Total | 111.0 |

The leather was dried and then finished with a conventional plated black finish. It was compared with other calfskins from the same lot of leather which had been similarly finished. The unimpregnated calfskins all showed good break near the backbone which rapidly worsened as tests of leather break were made at intervals moving out toward the periphery of the hide. Even the median area between backbone and flanks showed poor break on these skins. The flank area itself was loose and very bad breaking. The overall appearance and feel of the unimpregnated leathers was flat and a little unleatherlike and papery in feel.

The impregnated finished leather on the other hand showed a fine tight rolling break in all parts, even in the flank areas. The leather felt full and supple throughout. This fullness was outstanding in the flank areas in contrast to the unimpregnated skins.

Scuff resistance of the impregnated leather was outstanding. Vigorous scuffing across the unimpregnated leathers with a United States coin of 50 cents denomination produced extensive rupture of fibers. However, a similar scrubbing across the impregnated leather produced no change except for a slight increase in gloss where it had been scrubbed. Prolonged scrubbing led to melting of the finish from the frictional heat before fiber rupture occurred.

*Example 2*

(a) A copolymer was made by a process similar to that in Example 1(a), except that the monomer composition was:

| | Mol percent |
|---|---|
| Ethyl acrylate | 61 |
| Methyl methacrylate | 28 |
| Methacrylate from same mixed alcohol mixture as in Example 1 | 5 |
| Methacrylic acid | 6 |

The copolymer was prepared in Solvesso 100. The final concentration was 40% and its viscosity at that concentration was 99 cps. After dilution to 20% with Solvesso 100 its viscosity was 9 cps.

(b) An impregnation mixture was applied to bad breaking buffed, chrome-tanned, vegetable retanned steer hide by swabbing on two wet coats with a felt swab in a manner described in Example 1(b). Uptake of the solvent solution by the leather was 36% of its original weight.

The composition of the impregnation mixture was as follows:

| Ingredients: | Parts by weight |
|---|---|
| Polymer solution from section (a) of this example | 100.0 |
| Solvesso 100 | 48.0 |
| Raw neat's-foot oil (20° cold test) | 6.0 |
| Oleic acid | 0.6 |
| | 154.6 |

The leather was dried and then finished with a conventional black shoe upper leather finish and was compared with an unimpregnated but similarly finished adjacent section of leather from the same hide. The impregnated leather showed improved break characteristics, and improved scuff resistance over the unimpregnated section without noticeably detracting from the leather temper.

*Example 3*

Polymers were prepared in appropriate solvents by the procedure of Example 1(a) from mixtures of monomers in the proportions given hereinbelow.

(a)

3.5 mol percent of itaconic acid
30 mol percent of ethyl methacrylate
4.5 mol percent of octadecyl acrylate
62 mol percent of butyl acrylate (b)

12 mol percent of acrylic acid
33 mol percent of isobutyl methacrylate
8 mol percent of n-octyl acrylate
47 mol percent of methyl acrylate (c)

3.5 mol percent of itaconic acid
12.5 mol percent of methyl methacrylate
5 mol percent of vinyltoluene
5 mol percent of dodecyl acrylate
74 mol percent of ethyl acrylate (d)[1]

3.5 mol percent of itaconic acid
12.5 mol percent of methyl methacrylate
10 mol percent of vinylidene chloride
5 mol percent of dodecyl acrylate
69 mol percent of ethyl acrylate (e)

3.5 mol percent of itaconic acid
12.5 mol percent of methyl methacrylate
6 mol percent of acrylonitrile
5 mol percent of dodecyl acrylate
73 mol percent of ethyl acrylate (f)

3. mol percent of itaconic acid
12.5 mol percent of methyl methacrylate
2 mol percent of vinyl acetate
2 mol percent of vinyl chloride
2.5 mol percent of acrylonitrile
50 mol percent of ethyl acrylate
22.5 mol percent of methyl acrylate
5 mol percent of dodecyl acrylate Impregnating compositions were made from each of the polymers prepared from the mixtures (a) through (f) by diluting the copolymers with a mixture of xylene and ethylene chloride to form 22% solutions. The solutions were applied in the same manner as described in Example 1(c). The leathers thus impregnated were tested in the same manner as in Example 1(c). Similar improvements in break and scuff resistance were obtained while retaining desirable leather temper.

We claim:

1. A process for treating leather which comprises impregnating the leather on the grain side only with an organic solvent solution containing about 10% to 35% by weight of a water-insoluble copolymer of monoethylenically unsaturated molecules comprising (a) about 3.5 to 18.5 mol percent of at least one acid selected from the group consisting of acrylic acid, methacrylic acid, and itaconic acid, (b) about 1.5 to 8 mol percent of at least one ester of an acid of the formula

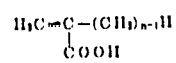

where $n$ is an integer having a value of 1 to 2, with a saturated monohydric aliphatic alcohol having 8 to 18 carbon atoms, (c) from 10.5 to 43 mol percent of at least one methacrylate selected from the group consisting of methyl, ethyl, and isobutyl methacrylate, and (d) about 47 to 84.5 mol percent of at least one ester of acrylic acid with a saturated monohydric alcohol having 1 to 4 carbon atoms, the total of (a) and (c) being 15 to 45 mol percent and the mol ratio of (b) to (c) being from 1:3.3 to 1:6.7, the copolymer having an average molecular weight of at least 10,000 and a viscosity not exceeding 20 centipoises in a 20% solution at 25° C. in the organic solvent in which it is applied, any pigment in the solution not exceeding 15 parts by weight per 100 parts by weight of the solution, the impregnation being effected to penetrate through the corium minor and to deposit copolymer down to the junction of the corium minor with the corium major, the remaining thickness of the leather being substantially free of the copolymer.

---

[1] In part (d), the benzoyl peroxide was replaced with azo-diisobutyronitrile as the catalyst.

2. A process as defined in claim 1 in which the copolymer also comprises up to 32.5 mol percent of at least one monomer selected from the group consisting of acrylonitrile, methacrylonitrile, vinyl acetate, vinyl chloride, vinylidene chloride, styrene, and vinyl toluene.

3. A process as defined in claim 1 in which the copolymer also comprises up to 5 mol percent of neutral hydrophilic monomer selected from the group consisting of hydroxyethyl acrylate, acrylamide, methacrylamide, and N-methylol-acrylamide.

4. A process as defined in claim 2 in which the copolymer also comprises up to 5 mol percent of neutral hydrophilic monomer selected from the group consisting of hydroxyethyl acrylate, acrylamide, methacrylamide, and N-methylol-acrylamide.

5. A process as defined in claim 1 in which the copolymer also comprises up to 32.5 mol percent of at least one monomer selected from the group consisting of acrylonitrile, methacrylonitrile, vinyl acetate, vinyl chloride, vinylidene chloride, styrene, and vinyl toluene, and also up to about 5 mol percent of neutral hydrophilic monomer selected from the group consisting of hydroxyethyl acrylate, acrylamide, methacrylamide, and N-methylol-acrylamide.

6. A process according to claim 1 in which the copolymer is a copolymer of ethyl acrylate, methacrylic acid, methyl methacrylate, and $(C_{14}-C_{18})$-alkyl methacrylate.

7. As an article of manufacture, a leather having, distributed through the corium minor, a water-insoluble copolymer of (a) about 3.5 to 18.5 mol percent of at least one acid selected from the group consisting of acrylic acid, methacrylic acid, and itaconic acid, (b) about 1.5 to 8 mol percent of at least one ester of an acid of the formula

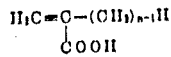
$$H_2C=C-(CH_2)_{n-1}H$$
$$COOH$$

where $n$ is an integer having a value of 1 to 2, with a saturated monohydric aliphatic alcohol having 8 to 18 carbon atoms, (c) from 10.5 to 43 mol percent of at least one methacrylate selected from the group consisting of methyl, ethyl, and isobutyl methacrylate, and (d) about 47 to 84.5 mol percent of at least one ester of acrylic acid with a saturated monohydric alcohol having 1 to 4 carbon atoms, the total of (a) and (c) being 15 to 45 mol percent and the mol ratio of (b) to (c) being from 1:3.3 to 1:6.7, the copolymer having an average molecular weight of at least 10,000 and a viscosity not exceeding 20 centipoises in a 20% solution at 25° C. in the organic solvent in which it is applied, the remaining thickness of the leather being substantially free of the copolymer.

8. An article as defined in claim 7 in which the copolymer comprises up to 32.5 mol percent of at least one monomer selected from the group consisting of acrylonitrile, methacrylonitrile, vinyl acetate, vinyl chloride, vinylidene chloride, styrene, and vinyl toluene.

9. An article as defined in claim 7 in which the copolymer comprises up to 5 mol percent of neutral hydrophilic monomer selected from the group consisting of hydroxyethyl acrylate, acrylamide, methacrylamide, and N-methylol-acrylamide.

10. An article as defined in claim 7 in which the copolymer comprises up to 32.5 mol percent of at least one monomer selected from the group consisting of acrylonitrile, methacrylonitrile, vinyl acetate, vinyl chloride, vinylidene chloride, styrene, and vinyl toluene, and also comprises up to about 5 mol percent of neutral hydrophilic monomer selected from the group consisting of hydroxyethyl acrylate, acrylamide, methacrylamide, and N-methylol-acrylamide.

11. As an article of manufacture, a leather having, distributed throughout the corium minor, a water-insoluble copolymer of (a) about 6 to 12.5 mol percent of at least one acid selected from the group consisting of acrylic acid, methacrylic acid, and itaconic acid, (b) about 1.5 to 5 mol percent of at least one ester of an acid of the formula

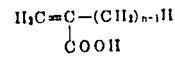
$$H_2C=C-(CH_2)_{n-1}H$$
$$COOH$$

wherein $n$ is an integer having a value of 1 to 2, with a saturated aliphatic monohydric alcohol having 8 to 18 carbon atoms, (c) from 16 to 27 mol percent of at least one methacrylate selected from the group consisting of methyl, ethyl, and isobutyl methacrylate, and (d) about 58.5 to 80 mol percent of at least one ester of acrylic acid with a saturated monohydric alcohol having 1 to 4 carbon atoms, the total of (a) and (c) being 15 to 45 mol percent and the ratio of (b) to (c) being from 1:3.3 to 1:6.7, the copolymer having an average molecular weight of at least 10,000 and a viscosity not exceeding 20 centipoises in a 20% solution at 25° C. in the organic solvent in which it is applied, the remaining thickness of the leather being substantially free of the copolymer.

References Cited by the Examiner

UNITED STATES PATENTS

| | | | |
|---|---|---|---|
| 2,828,224 | 3/1958 | Alps et al. | 117—142 |
| 2,862,901 | 12/1958 | Suen et al. | 117—142 |
| 2,884,336 | 4/1959 | Loshaek et al. | 117—142 |
| 2,953,550 | 9/1960 | Frostick et al. | 117—142 |
| 3,103,447 | 9/1963 | Lowell et al. | 117—142 |

RICHARD D. NEVINS, *Primary Examiner.*